United States Patent
Sibum

(10) Patent No.: US 7,296,348 B2
(45) Date of Patent: Nov. 20, 2007

(54) FLAT PRODUCT OF METAL, IN PARTICULAR, IN THE FORM OF A WALL FOR HEAT EXCHANGERS, AS WELL AS A HEAT EXCHANGER WITH A DOUBLE LAYER WALL OF COPPER AND TITANIUM

(75) Inventor: Heinz Sibum, Essen (DE)

(73) Assignee: Deutsche Titan GmbH, Essen (DE)

( * ) Notice: Subject to any disclaimer, the term of this patent is extended or adjusted under 35 U.S.C. 154(b) by 82 days.

(21) Appl. No.: 10/485,334

(22) PCT Filed: Jul. 10, 2002

(86) PCT No.: PCT/EP02/07659

§ 371 (c)(1),
(2), (4) Date: Jun. 29, 2004

(87) PCT Pub. No.: WO03/013847

PCT Pub. Date: Feb. 20, 2003

(65) Prior Publication Data

US 2004/0231156 A1    Nov. 25, 2004

(30) Foreign Application Priority Data

Aug. 7, 2001 (DE) .................. 101 37 933
Sep. 7, 2001 (DE) .................. 101 43 836

(51) Int. Cl.
*B21D 53/02*  (2006.01)
*B21D 39/06*  (2006.01)

(52) U.S. Cl. .................. 29/890.03; 29/890.039

(58) Field of Classification Search ............ 29/890.03, 29/890.032, 890.036, 890.039, 890.041, 29/890.053, 90.036; 165/133, 134.1
See application file for complete search history.

(56) References Cited

U.S. PATENT DOCUMENTS

| 3,018,543 | A | * | 1/1962 | Beck .................. 228/173.6 |
| 3,024,002 | A | * | 3/1962 | Beck ...................... 165/166 |
| 3,222,144 | A | * | 12/1965 | Davenport ............... 428/593 |
| 3,345,735 | A | * | 10/1967 | Nicholls .................. 228/118 |
| 4,503,314 | A | | 3/1985 | Kakimi et al. |
| 4,780,374 | A | | 10/1988 | Mizuhara |
| 5,533,258 | A | * | 7/1996 | Rainer et al. ........... 29/890.03 |

FOREIGN PATENT DOCUMENTS

| DE | 2151744 | | 7/1985 |
| JP | 61001416 | | 1/1985 |
| JP | 61168797 | | 7/1986 |
| JP | 63219555 | * | 3/1987 |
| JP | 63219555 | | 9/1988 |
| JP | 63317334 | | 12/1988 |
| JP | 03189071 | | 8/1991 |

* cited by examiner

*Primary Examiner*—John C Hong
(74) *Attorney, Agent, or Firm*—Proskauer Rose, LLP

(57) ABSTRACT

The invention pertains to a flat product in the form of a wall for a heat exchanger that is operated with cooling mediums in the form of corrosive liquids that contain biological organisms. In order to protect the wall of the heat exchanger against corrosion on the side that comes in contact with the cooling medium and to prevent biological organisms from settling down on the heat exchanger wall, the wall consists of a titanium or titanium alloy layer and a copper/titanium alloy layer that is integrally connected to the titanium or titanium alloy layer by means of an intermediate alloy layer.

5 Claims, No Drawings

FLAT PRODUCT OF METAL, IN PARTICULAR, IN THE FORM OF A WALL FOR HEAT EXCHANGERS, AS WELL AS A HEAT EXCHANGER WITH A DOUBLE LAYER WALL OF COPPER AND TITANIUM

BACKGROUND OF THE INVENTION

The invention pertains to a flat product of metal, in particular, in the form of a wall for a heat exchanger which consists of a composite material comprising a titanium or titanium alloy layer and a copper alloy layer.

The invention also pertains to a heat exchanger, the wall of which can be exposed to a cooling medium in the form of a liquid that contains biological organisms, wherein said wall consists of a copper alloy layer that faces the cooling medium and a titanium or titanium alloy layer that tightly adjoins the copper alloy layer and faces away from the cooling medium.

Heat exchangers of this type are known in the form of tubular elements (GB 2 151 744 A). In this known heat exchanger, the tube walls consist of two layers, wherein the inner tube consists of copper or a copper alloy and the outer tube consists of titanium. Both tubes have the same wall thickness of 0.5 mm. The inserted inner tube is hydraulically expanded in order to bring the inner tube in contact with the outer tube over its entire surface.

The development of such a tubular heat exchanger with double layer walls was based on the notion that, although titanium provides an excellent protection against corrosion, biological organisms are deposited or settle down (biofouling) on its contact surface with cooling mediums in the form of liquids that contain biological organisms, e.g., seawater or brackish water. This is caused by the distinctive biocompatibility of titanium and impairs the heat transmission. In extreme instances, it may even occur that the heat exchanger becomes clogged. These disadvantages can be eliminated if the inside of the titanium tube is lined with a copper tube, namely because copper has a toxic effect on biological organisms. However, it is disadvantageous that the copper or copper alloy only provides a weak protection against corrosion when it comes in contact with aggressive mediums such as seawater (0.5 mm erosion/year), and that the heat transmission from the inner copper tube to the outer titanium tube is also more or less impaired on the boundary between the copper tube and the titanium tube if both tubes tightly adjoin one another (high heat transmission resistance).

In another heat exchanger of this type which is realized in the form of a multi-tube heat exchanger, the tubes of titanium are connected to a tube receptacle plate of a copper alloy (JP 60 11 70 99 A). In case of an interruption in the operation of the heat exchanger, the water circulation is shut down such that the protection against electric corrosion between the different metals of the tubes (titanium) and the tube receptacle plate (copper alloy) is no longer effective. In order to prevent an undesirable electric corrosion in such instances, sacrificial electrodes that are in intimate and electrically conductive contact with the titanium tubes and consist of the same copper alloy as the tube receptacle plate are arranged on the surface of the titanium tubes. If the water circulation is shut down, the occurring electric corrosion only takes place between the titanium tubes and the sacrificial electrodes such that the undesirable electric corrosion between the tubes and the tube receptacle plate is prevented. The sacrificial electrodes are replaced as required such that a permanent protection against electric corrosion between the titanium tubes and the tube receptacle plate is ensured.

SUMMARY OF THE INVENTION

The invention is based on the objective of developing a flat product of metal that, in particular, is suitable for use as a heat exchanger wall and protected against corrosion on the side that comes in contact with aggressive liquids that contain biological organisms, in particular, seawater. The flat product of metal is also protected from biological organisms settling down or depositing thereon (biofouling). The invention also aims to develop a heat exchanger that is suitable for use with cooling mediums in the form of aggressive liquids that contain biological organisms. It should, in particular, be possible to achieve a permanently optimal heat transmission without any maintenance procedures.

DETAILED DESCRIPTION OF THE INVENTION

According to the invention, the first objective is attained due to the fact that the copper alloy of the one layer consists of a copper/titanium alloy that is integrally connected to the other layer of titanium or a titanium alloy, in particular, by means of alloying.

The second objective is attained with a heat exchanger of the initially described type due to the fact that the two layers are integrally connected to one another by means of a copper/titanium boundary layer. This integral connection is, in particular, produced with a copper/titanium alloy layer that preferably extends up to the surface that is exposed to the aggressive cooling medium.

In the heat exchanger according to the invention, biological organisms are prevented from settling down or depositing on the heat exchanger because the copper or copper alloy layer is exposed to the cooling medium. When using aggressive, corrosive cooling mediums, a superior protection against corrosion is ensured by the titanium that is preferably alloyed with the copper up to the surface that is exposed to the cooling medium. In addition, a superior heat transmission between the wall surface that is exposed to the cooling medium and the surface that faces away from the cooling medium is ensured due to the integral copper/titanium boundary layer, in particular, the alloy layer. Consequently, the flat product and a heat exchanger manufactured thereof have a high degree of efficiency and require no maintenance.

The invention also pertains to a method for manufacturing a heat exchanger according to the invention. In this method, a strip of a titanium material is plated with a strip of a copper material that, in particular, is thinner than the titanium strip, wherein the thusly obtained composite strip is shaped into plates or tubes that are joined such that heat exchangers are obtained, and wherein the composite strip is subjected to a heat treatment before or after the plates or tubes are shaped in order to form an alloy layer between the two materials.

In such a method, the integral connection in the form of an alloy layer is formed during the heat treatment. The heat treatment also has a soft-annealing effect, in particular, on the titanium material that was hardened due to the plating process. This soft-annealing is particularly advantageous if the composite strip needs to be subjected to a more significant deformation during the manufacture of the heat exchanger.

If the composite strip still has a sufficient deformability after the plating process despite a certain strain-hardening, it is possible to cut suitable blanks immediately after the plating step and to shape these blanks into tubes for tubular heat exchangers. In this case, the finished tubes are subjected to the heat treatment required for forming the alloy layer.

If the strain-hardening of the composite strip is excessively high after the plating step such that the composite strip no longer has a sufficient deformability, it is initially required to soft-anneal the composite strip, e.g., in a continuous operation, in which the alloy layer is simultaneously formed. Subsequently, the composite strip can be additionally deformed, e.g., into tubes.

It is particularly advantageous to carry out the soft-annealing and the heat treatment required for forming the alloy layer in one step, i.e., simultaneously. If it is required to additionally deform the composite strip after such a double effect heat treatment, it needs to be ensured that the copper/titanium alloy layer has a sufficient ductility for participating in the deformation without becoming damaged (e.g., due to chipping). This is achieved by choosing the dimensions of the copper strip so thin in relation to the titanium carrier strip that the formation of an excessively thick and brittle alloy layer is prevented.

In this respect, the invention proposes that the material thickness of the layer that faces away from the cooling medium, i.e., the titanium or titanium alloy layer, amounts to a multiple of the material thickness of the layer that faces the cooling medium, i.e., the copper or copper alloy layer. The copper layer preferably has a material thickness between 0.05 and 0.2 mm, and the titanium layer has a material thickness between 0.2 and 2.0 mm. These dimensions ensure that a thorough alloying of the layer that faces the cooling medium can be achieved.

The heat treatment preferably takes place in an inert gas atmosphere at a temperature between 800° C. and 1000° C. A heat treatment duration between 5 and 15 minutes suffices for ensuring the formation of the alloy layer and the soft-annealing effect. The heat treatment of the composite strip, from which blanks for the plates and strips for the tubes of the heat exchangers are cut, is preferably realized in the form of a continuous operation.

A composite strip for the plates of a plate heat exchanger or the strips of a tubular heat exchanger is manufactured by plating a strip of titanium or a titanium alloy that preferably has a thickness between 0.4 and 1.0 mm with a copper foil that preferably has a thickness of 0.1 mm. It is possible to utilize conventional plating techniques, in particular, the roll-plating technique. The plating ensures a mechanically solid bond between the copper foil and the titanium strip. The obtained composite strip is then subjected to a specific heat treatment, in particular, by transporting the strip through an annealing furnace, in which an inert gas atmosphere is maintained. The treatment temperature preferably lies between 800° C. and 1000° C. The strip speed lies between 5 and 20 m/minute. Treatment times between 5 and 15 minutes can be achieved if the path of the strip passing through the furnace is realized accordingly. This type of heat treatment ensures that the material which was significantly strain-hardened during the roll-plating process is soft-annealed. In addition, the alloying of copper and titanium not only results in the formation of an integral boundary layer that ensures a superior heat transmission between the copper/titanium layer and the titanium layer, but also provides an excellent protection against corrosion.

The invention claimed is:

1. A method for manufacturing a heat exchanger including a wall that is exposed to cooling mediums in the form of liquids containing biological organisms, the method comprising:

plating a strip of a titanium material with a strip of a copper material to form a composite strip;

shaping the composite strip into plates or tubes;

subjecting the composite strip to a heat treatment before or after the plates or tubes are shaped to form an alloy boundary layer between the two materials, the heat treatment of the composite strip achieving a thorough alloying of the copper materials; and joining the plates or tubes to obtain heat exchangers with the thorough alloyed copper material of the composite strip facing the cooling mediums to provide protection against biofouling.

2. The method for manufacturing a heat exchanger according to claim 1, wherein the heat treatment takes place in an inert gas atmosphere at a temperature between 800° C. and 1000° C.

3. The method for manufacturing a heat exchanger according to claim 1, wherein the heat treatment is carried out for a duration between 5 and 15 minutes.

4. The method for manufacturing a heat exchanger according to claim 1, wherein the heat treatment of the composite strip is carried out in the form of a continuous operation.

5. The method for manufacturing a heat exchanger according to claim 1, wherein the heat treatment takes place at a temperature which is below the melting points of the titanium material and the copper material.

* * * * *

UNITED STATES PATENT AND TRADEMARK OFFICE
CERTIFICATE OF CORRECTION

PATENT NO.        : 7,296,348 B2                                    Page 1 of 1
APPLICATION NO.   : 10/485334
DATED             : November 20, 2007
INVENTOR(S)       : Sibum It is certified that error appears in the above-identified patent and that said Letters Patent is hereby corrected as shown below:

In claim 1, column 4, line 27, delete "materials" and replace it with --material--

Signed and Sealed this

Fifteenth Day of April, 2008

JON W. DUDAS
*Director of the United States Patent and Trademark Office*